(12) United States Patent
Chao et al.

(10) Patent No.: US 6,758,604 B2
(45) Date of Patent: Jul. 6, 2004

(54) PIGTAIL ASSEMBLY APPARATUS AND METHOD THEREOF

(75) Inventors: Sheng-Jui Chao, Taichung (TW); Tsui-Lan Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 10/361,412

(22) Filed: Feb. 10, 2003

(65) Prior Publication Data

US 2004/0037511 A1 Feb. 26, 2004

(30) Foreign Application Priority Data

Aug. 21, 2002 (TW) ........................................ 91118879 A

(51) Int. Cl.⁷ ................................................ G02B 6/36
(52) U.S. Cl. ............................ 385/80; 385/147; 257/98
(58) Field of Search ........................ 385/76, 80, 88–90, 385/139, 14, 7, 52, 53, 92; 257/98; 359/620; 356/479, 497; 372/34, 38.02

(56) References Cited

U.S. PATENT DOCUMENTS

| | | | | |
|---|---|---|---|---|
| 5,412,748 A | * | 5/1995 | Furuyama et al. | ............ 385/92 |
| 5,596,409 A | * | 1/1997 | Marcus et al. | ............... 356/479 |
| 5,659,392 A | * | 8/1997 | Marcus et al. | ............... 356/497 |
| 6,325,551 B1 | * | 12/2001 | Williamson, III et al. | ..... 385/88 |
| 6,654,175 B2 | * | 11/2003 | Brophy et al. | ............... 359/620 |
| 2002/0168147 A1 | * | 11/2002 | Case et al. | ..................... 385/53 |
| 2003/0007774 A1 | * | 1/2003 | Christopher et al. | ........ 385/147 |
| 2003/0072337 A1 | * | 4/2003 | Miguelez et al. | ............. 372/34 |
| 2003/0075722 A1 | * | 4/2003 | Brophy et al. | ................ 257/98 |
| 2004/0037511 A1 | * | 2/2004 | Chao et al. | .................... 385/80 |

* cited by examiner

*Primary Examiner*—Akm Enayet Ullah
(74) *Attorney, Agent, or Firm*—Thomas, Kayden, Horstemeyer & Risley

(57) ABSTRACT

The invention provides an assembly apparatus and method about manufacturing pigtail. The pigtail assembly apparatus includes a fiber-feeding module, peeling module, gluing module, insertion module and heating module, all controlled by a control module. The fiber-feeding module provides a predetermined length of optical fiber. The peeling module peels the cladding layer at one end of the optical fiber, exposing the core portion. The insertion module inserts the core portion of the optical fiber into a through hole of a glass capillary with adhesive added. The heating module solidifies the adhesive and finally forms a pigtail fiber.

13 Claims, 6 Drawing Sheets

PIGTAIL ASSEMBLY APPARATUS AND METHOD THEREOF

BACKGROUND OF THE INVENTION

1. Field of the Invention

The present invention relates to a pigtail assembly apparatus and method thereof, and in particular to an apparatus for automatically assembling pigtails.

2. Description of the Related Art

As active/passive optical components are developed, optical cables are widely used in long distance communications. Collimators are one of those important components, and each collimator has a pigtail and a GRIN lens. The light beam emitted from the pigtail passes through the GRIN lens, and then the collimator emits a collimated light beam.

FIG. 1 shows the cross section of an optical collimator. As shown in FIG. 1, the optical fiber 10 includes a core portion 13 and a cladding layer 14. A glass capillary 12 grasps the optical fiber 10, forming a pigtail 16. A GRIN lens 11 has an inclination and is positioned in a ferrule 15 by using glue. The pigtail 10 is inserted into the ferrule 15. The distance between the GRIN lens 11 and the pigtail 16 is adjusted till the collimated light beam is obtained from the GRIN lens 11. Finally, all the elements constructing the collimator are fixed.

According to the structure in FIG. 1, the diameter of the optical fiber 10 is less than 0.2 mm, and the core portion 11 is 0.125 mm. The glass capillary is about 1.5~2 mm around and 8 mm long. Because the optical fiber 10 and the glass capillary 12 are thin and small, it is difficult to peel the cladding layer 14 from the optical fiber 10 and then insert the core portion 13 into the glass capillary 12. Conventional pigtail fibers are made by hand, requiring considerable labor, with limited efficiency, and frequently insufficient quality. Thus, the cost of the conventional pigtail fibers cannot be reduced.

Hence, there is a need for a pigtail fiber assembly apparatus to automatically manufacture pigtail fibers, increasing production efficiency and reducing costs.

SUMMARY OF THE INVENTION

Accordingly, an object of the invention provides an apparatus to automatically manufacture pigtails, shorten production time, increase yield and reduce cost.

The present invention provides a pigtail assembly apparatus inserting an optical fiber into a glass capillary, forming a pigtail fiber. The pigtail assembly apparatus includes a fiber-feeding module, a peeling module, a gluing module, an insertion module and a heating module, all controlled by a control module. The fiber-feeding module provides a predetermined length of optical fiber. The peeling module peels the cladding layer from one end of the optical fiber, exposing the core portion. The insertion module inserts the core portion of the optical fiber into a through hole of a glass capillary with adhesive. The heating module solidifies the adhesive, finally forming a pigtail.

The present invention also provides a method for operating the pigtail assembly apparatus. The method includes the fiber-feeding module providing a first length of optical fiber, providing a glass capillary, removal of a second length of the cladding layer of the optical fiber by the peeling module to expose the core portion, the gluing module providing adhesive in the recess of the glass capillary, insertion by the insertion module of the core portion of the optical fiber into the through hole, and the heating module solidifying the adhesive, thereby it forming a pigtail.

According to the invention, the fiber-feeding module includes a roller to hold a roll of the optical fiber, a motor driving the roller to release a predetermined length of the optical fiber, a first position sensor sensing the end of the optical fiber, a first clipper clipping the optical fiber and dragging it to the first position sensor when the motor stops, a second position sensor sensing the end of the optical fiber, a second clipper clipping the end of the optical fiber, and a cutter cutting the optical fiber to provide a first length of optical fiber.

Furthermore, the peeling module is a vise mechanism. The pigtail assembly apparatus further includes a cleaning module to clean the surface of the exposed core. The cleaning module includes a wiping mechanism and a supersonic cleaning machine. The gluing module is an injector with adhesive therein, comprising thermal-curing epoxy or UV-curing epoxy.

According to the invention, the pigtail assembly apparatus further includes a third clipper moving the glass capillary to a predetermined position, and a third position sensor inserting the core portion into the through hole of the glass capillary when sensing the third clipper in the predetermined position.

Moreover, the heating module is an infrared heater or an oven. The control module further includes a microprocessor.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
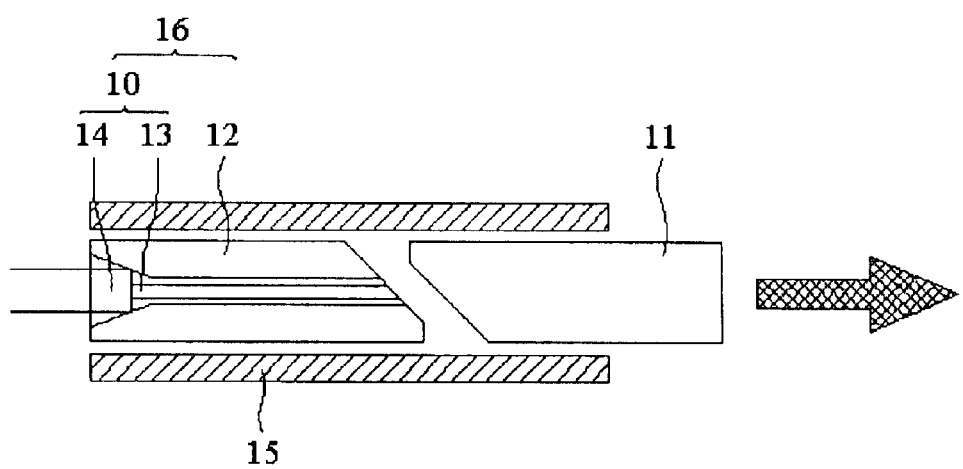
FIG. 1 is cross section of a fiber collimator as referenced in the Prior Art.
Figure 2:
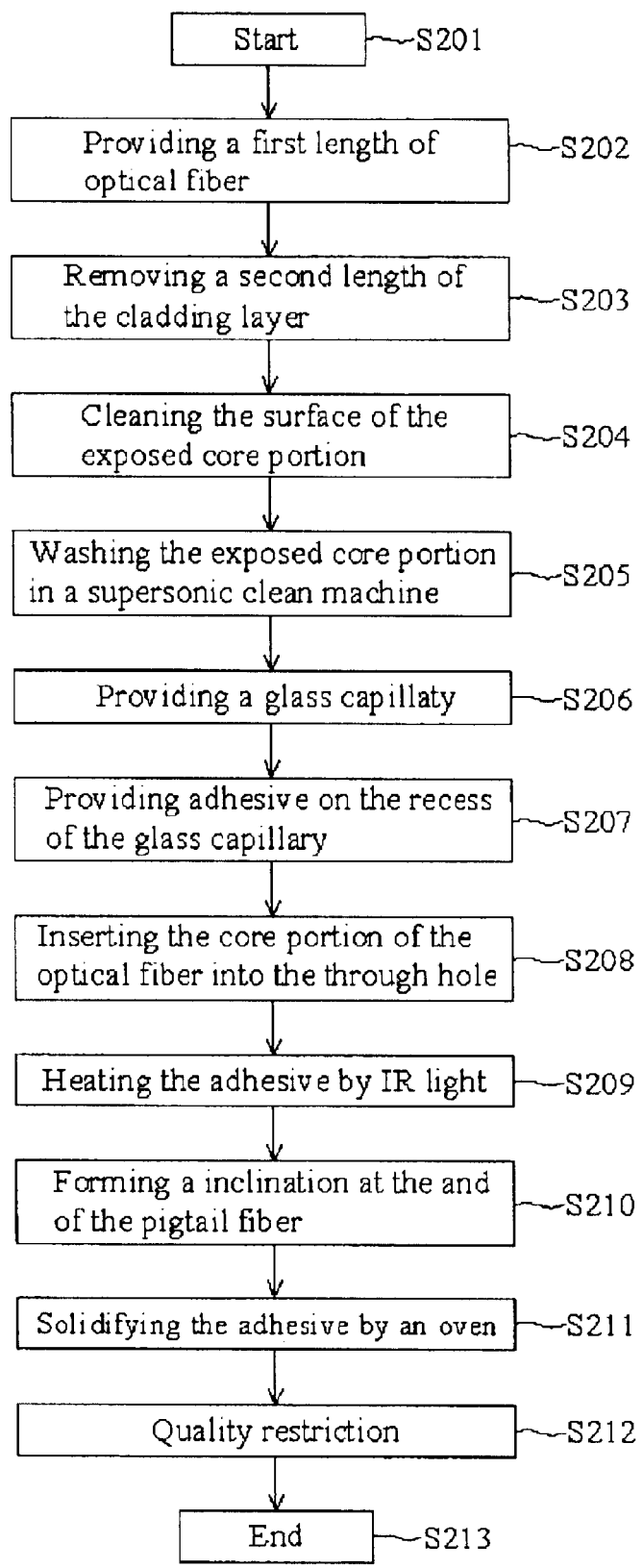
FIG. 2 is a flowchart showing the manufacturing process for pigtail fibers.

FIG. 2 is a flowchart of the pigtail manufacturing process of the invention. First, a fiber-feeding module provides a first length of the optical fiber (S202). A peeling module removes a second length of the cladding layer of the optical fiber to expose the core portion (S203). The surface of the exposed core portion is wiped to remove small particles (S204), and then washed again by a supersonic cleaning machine (S205). Next, a glass capillary with a through hole extending from a recess is provided (S206). A gluing module places a drop of adhesive in the recess (S207). The exposed core portion is then inserted into the through hole of the glass capillary (S208) and heated to solidify the adhesive (S209). The end of the pigtail is grounded, forming an inclination to adjust the optic coupling ratio of the fiber collimator (S210). The pigtail is heated again to secure the optical fiber (S211). Finally, the pigtail are quality-checked (S212), finishing the process.

Figure 3:
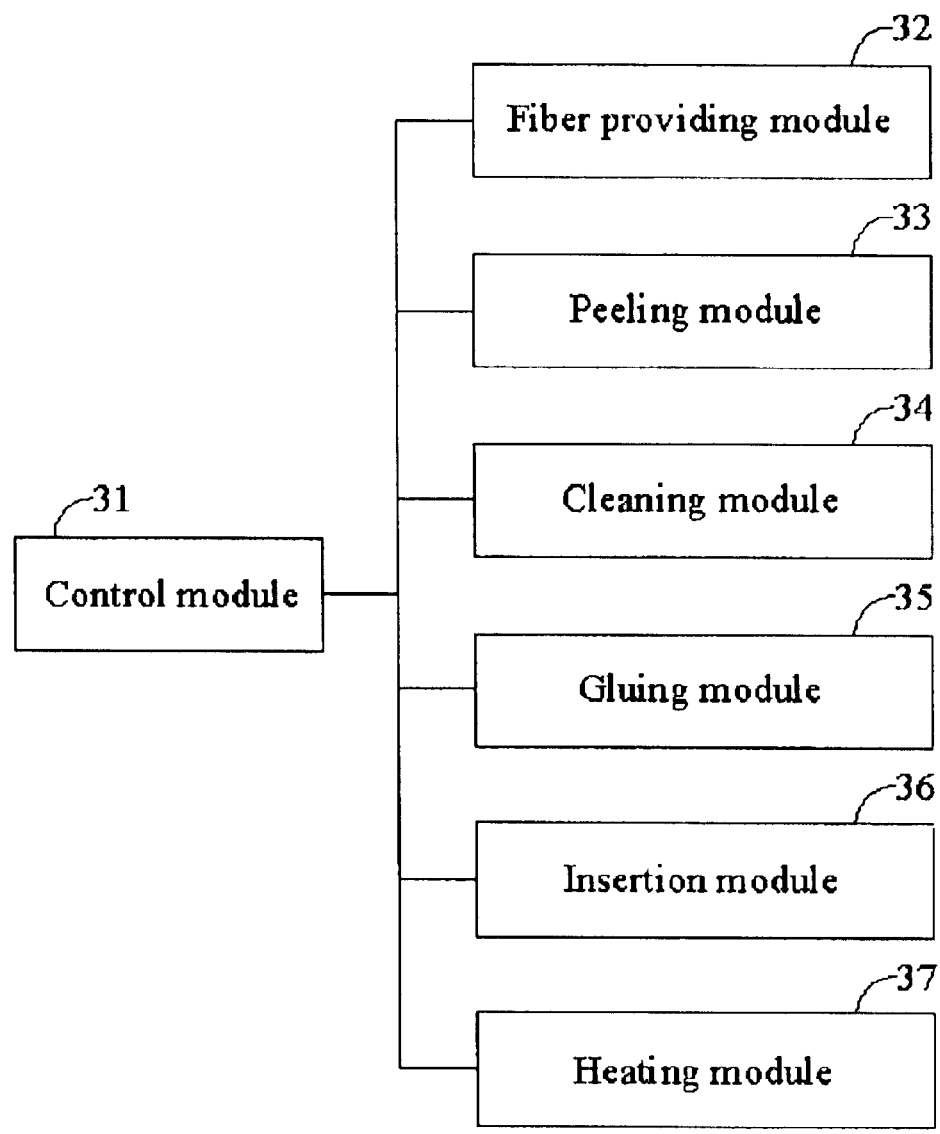
FIG. 3 is a block diagram of the pigtail fiber assembly apparatus of the invention.

FIG. 3 is a block diagram of the pigtail assembly apparatus of the invention. The assembly apparatus includes a fiber-feeding module 32, peeling module 33, cleaning module 34, gluing module 35, insertion module 36 and heating module 37, all controlled by a control module 31. The fiber-feeding module 32 provides a first length of optical fiber. The peeling module 33 peels the cladding layer from the optical fibers, exposing a second length of the core portions. The cleaning module 34 cleans the surface of the exposed core portions. The gluing module 35 adds adhesive in the recesses of the glass capillaries. The insertion module 36 inserts the core portion of optical fibers into the through hole of the glass capillaries. The heating module 37 solidifies the adhesive to secure the core portion of optical fibers in the glass capillaries. The control module 31 is a computer, control server, or control panel with a microprocessor, driving the modules through dedicated programs to automatically manufacture pigtail.

Figure 4A:
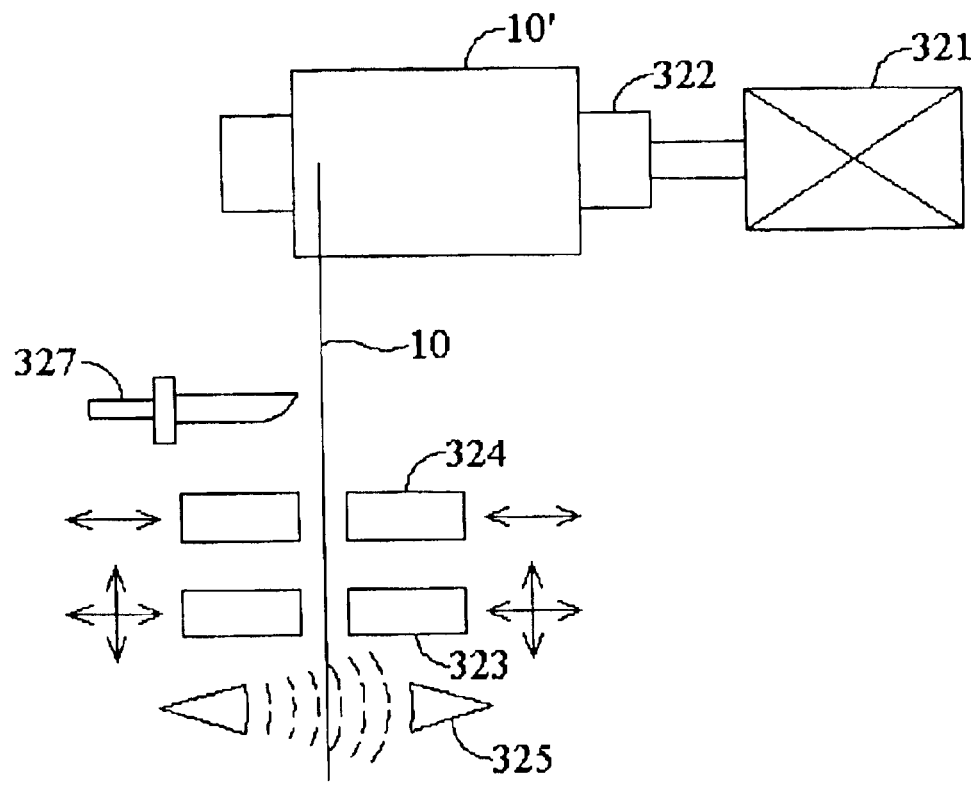
FIG. 4A is a schematic view of the pigtail fiber assembly apparatus in the original position.
Figure 4A:
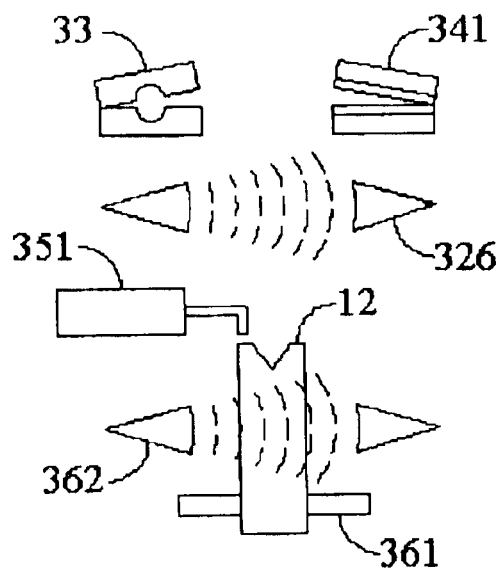

FIG. 4A is a schematic view of the pigtail assembly apparatus in the original position. In FIG. 4, the fiber-feeding module includes a motor 321, roller 322, first and second position sensors 325, 326, first and second clippers 323, 324, and cutter 327. The roller 322 driven by the motor 321 holds a roll of the optical fiber 10'. The cutter 327, the second clipper 324, the first clipper 323, the first position sensor 325 and the second position sensor 326 are sequentially disposed under the roller 322. First, the motor 321 controlled by the control module drives the roller 322 to lower the end of the optical fiber 10. The first position sensor 325 sends a first stop signal to the control module to stop the motor 321 when it senses the end of the optical fiber 10. The first clipper 323 controlled by the control module clips the optical fiber 10 and drags it a predetermined distance after the motor 321 stops. At this time, the roller 322 is freed by of a clutch (not shown) between the roller 322 and the motor 321.

Figure 4B:
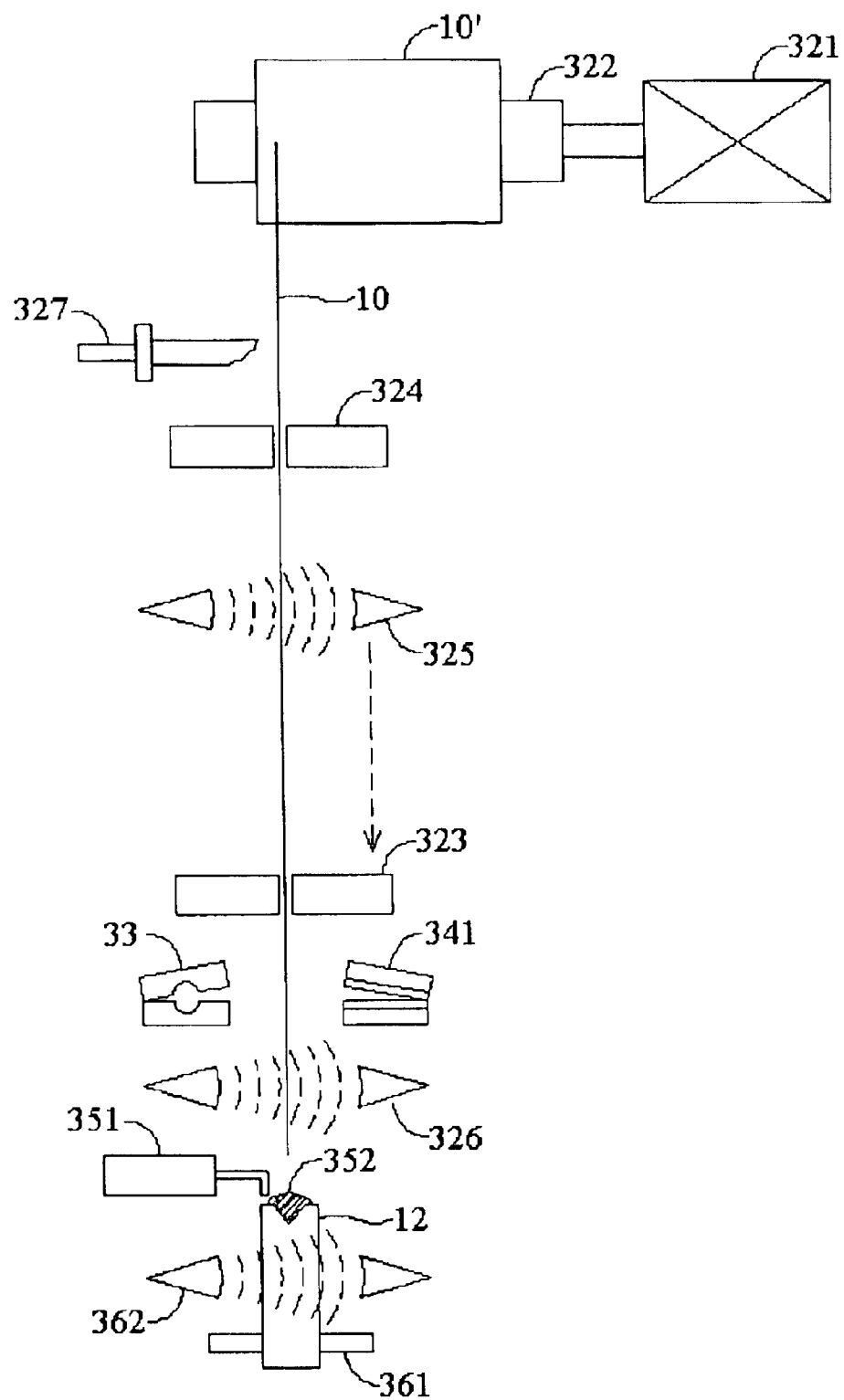
FIG. 4B is a schematic view of the first length of the optical fiber being generated.

As shown in FIG. 4B, when the second position sensor 326 senses the end of the optical fiber 10, it sends a second stop signal to the control module to stop the first clipper 323. The second clipper 324 controlled by the control module clips the optical fiber 10, and then the cutter 327 cuts the optical fiber 10 to provide a first length of the optical fiber, finishing the fiber-feeding process.

In FIGS. 3 and 4B, a vise mechanism 33 and a wiping mechanism 341 are disposed below the first clipper 323. The vise mechanism 33 peels a second length of the cladding layer at the end of the optical fiber 10. The exposed core portion of the optical fiber is not shorter than the glass capillary 12. The wiping mechanism 341 is a clipper covered with thick soft material, such as PU, at the jaw portion. After the cladding layer is removed, the control module controls the wiping mechanism 341 to grasp the core portion of the optical fiber 10 and move downward to remove small particles from the surface. Furthermore, the cleaning module can be a supersonic cleaning machine. The first and second clippers 323, 324 move and soak the exposed core portion in the supersonic cleaning machine for further cleaning.

Figure 4C:
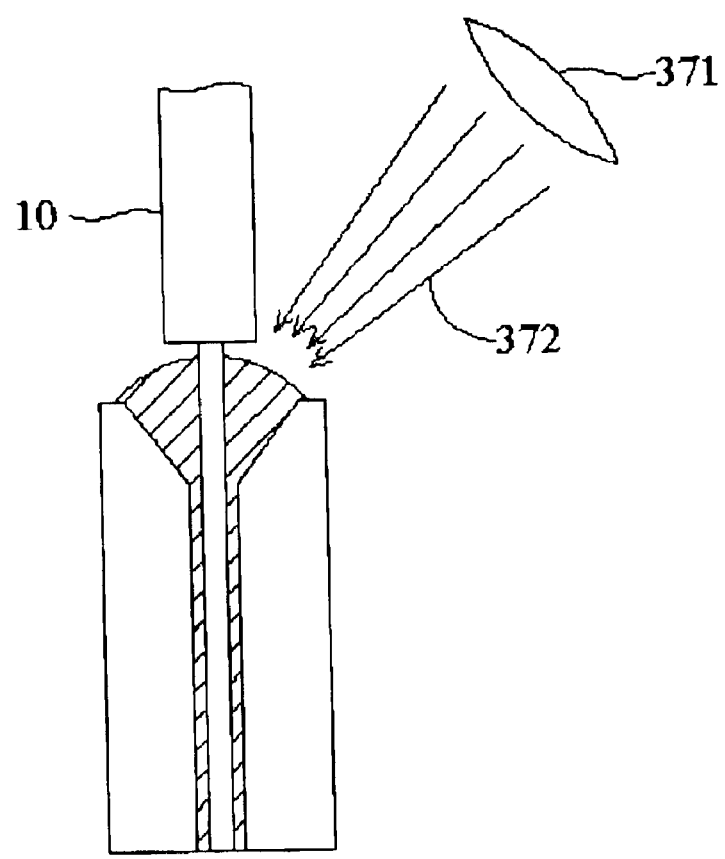
FIG. 4C is a schematic view of the IR heating process.

After cleaning the surface of the core portion, the control module controls the third clipper 361 of the insertion module to move the glass capillary 12 to the predetermined position under the second position sensor 326. When sensing the third clipper 361 in this predetermined position, the third position sensor 362 sends a third stop signal to the control module. The gluing module is an injector 351 with adhesive therein. According to the third stop signal, the control module controls the injector 351 of the gluing module to add adhesive 352 in the recess of the glass capillary 12. The first clipper 323 inserts the core portion of the optical fiber 10 into the through hole of the glass capillary 12 (as shown in FIG. 4C). Furthermore, the first, the second and the third position sensors 323, 324, 362 are IR sensors or charge-coupled devices controlled by the microprocessor of the control module to achieve precise position control.

FIG. 4C is a schematic view of the IR heating process. When the core portion of the optical fiber 10 is inserted into the glass capillary 12, the first clipper 323 moves back and forth to spread the adhesive in the through hole. At this time, the adhesive does not harden, requiring another process to solidify, securing the optical fiber. In a preferred embodiment, the adhesive can be thermal-curing epoxy. The adhesive 352 on the recess and in the through hole is heated by an IR heater to initially solidify the thermal-curing epoxy. Next, the pigtail is moved to an oven to completely solidify the adhesive, securing the optical fiber on the glass capillary. Another preferred adhesive is UV-curing epoxy, for which a heating module having a UV light solidifies the UV-curing epoxy. After that, the protruding core portion of the pigtail is removed. An inclination is formed by grounding at the end of the pigtail. The automatically pigtail assembly process is finished.

Accordingly, the assembly apparatus and method of the invention makes the manufacture of pigtails possible. It shortens the production time of the pigtail, and further increases the yield ratio and reduces cost.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pigtail assembly apparatus for inserting an optical fiber into a glass capillary, the optical fiber having a core portion and a cladding layer, the glass capillary having a through hole extending from a recess, comprising:
    a fiber-feeding module, providing a first length of the optical fiber;
    a peeling module, removing a second length of the cladding layer and exposing the core portion of the optical fiber;
    a gluing module, providing adhesive in the recess;
    an insertion module, inserting the core portion of the optical fiber into the through hole; and
    a heating module, solidifying the adhesive to fix the core portion in the through hole; and
    a control module, controlling the fiber-feeding module, the peeling module, the gluing module, the insertion module and the heating module.

2. The pigtail assembly apparatus as claimed in claim 1, the fiber-feeding module further comprising:
    a roller holding a roll of the optical fiber;
    a motor connected to the roller and driving the roller to release a predetermined length of the optical fiber;
    a first position sensor, sending a first stop signal to the control module to stop the motor when sensing the end of the optical fiber;
    a first clipper, disposed between the roller and the first position sensor, wherein the first clipper, controlled by the control module, clips the optical fiber, dragging it a predetermined distance when the motor stops;

a second position sensor, sending a second stop signal to the control module to stop the first clipper when sensing the end of the optical fiber;

a second clipper, disposed between the roller and the first position sensor, wherein the second clipper controlled by the control module clips the optical fiber when the first clipper stops; and a cutter, disposed between the roller and the second clipper, wherein the cutter cuts the optical fiber to provide a first length of the optical fiber after the second clipper clip the optical fiber.

3. The pigtail assembly apparatus as claimed in claim 1, wherein the peeling module is a vise mechanism controlled by the control module to peel a second length of the cladding layer, exposing the core portion at the end of the optical fiber.

4. The pigtail assembly apparatus as claimed in claim 1, further comprising a cleaning module cleaning the surface of the exposed core.

5. The pigtail assembly apparatus as claimed in claim 4, wherein the cleaning module includes a wiping mechanism to wipe the surface of the exposed core.

6. The pigtail assembly apparatus as claimed in claim 1, wherein the gluing module is an injector with adhesive therein.

7. The pigtail assembly apparatus as claimed in claim 1, wherein the insertion module further comprises:

a third clipper, moving the glass capillary to a predetermined position;

a third position sensor, sending a third stop signal to the control module, controlling the first clipper inserting the core portion into the through hole of the glass capillary when sensing the third clipper in the predetermined position.

8. The pigtail assembly apparatus as claimed in claim 4, wherein the adhesive is thermal-curing epoxy, and the heating module is an infrared heater or an oven.

9. The pigtail assembly apparatus as claimed in claim 1, wherein the adhesive is UV-curing epoxy, and the heating module further comprises a UV light.

10. The pigtail assembly apparatus as claimed in claim 1, wherein the control module includes a microprocessor.

11. A method for operating the pigtail assembly apparatus as claimed in claim 1, comprising the steps of:

provision of a first length of optical fiber having a core portion with a cladding layer by a fiber-providing module;

providing a glass capillary having a through hole extending from a recess at one end;

removal of a second length of the cladding layer of the optical fiber to expose the core portion by the peeling module;

providing adhesive in the recess by the gluing module;

insertion of the core portion of the optical fiber into the through hole by the insertion module; and solidification of the adhesive by the heating module.

12. The method as claimed in claim 11, further comprising a cleaning module cleaning the exposed core portion.

13. The method as claimed in claim 11, further comprising the step of cleaning the exposed core portion in a supersonic cleaning machine.

* * * * *